United States Patent
Bjurman et al.

(10) Patent No.: US 6,495,835 B1
(45) Date of Patent: Dec. 17, 2002

(54) DEVICE FOR DETERMINING NUCLIDE CONTENTS OF RADIOACTIVE INERT GASES

(75) Inventors: Björn Bjurman, Östhammar (SE); Lembit Sihver, Västerås (SE)

(73) Assignee: ABB Atom AB, Vasteras (SE)

( * ) Notice: Subject to any disclaimer, the term of this patent is extended or adjusted under 35 U.S.C. 154(b) by 0 days.

(21) Appl. No.: 09/381,694

(22) PCT Filed: Apr. 15, 1998

(86) PCT No.: PCT/SE99/00689

§ 371 (c)(1),
(2), (4) Date: Mar. 14, 2000

(87) PCT Pub. No.: WO98/47023

PCT Pub. Date: Oct. 22, 1998

(30) Foreign Application Priority Data

Apr. 16, 1997 (SE) .................................. 9701407

(51) Int. Cl.⁷ .............................................. G01N 24/00
(52) U.S. Cl. ................................. 250/370.01; 250/304
(58) Field of Search .......................... 250/370.01, 304, 250/364, 255, 380

(56) References Cited

U.S. PATENT DOCUMENTS

| | | | | |
|---|---|---|---|---|
| 3,617,709 A | * | 11/1971 | Tone | 250/83.6 |
| 3,940,618 A | * | 2/1976 | Donguy | 250/304 |
| 3,968,371 A | * | 7/1976 | Greendale | 250/380 |
| 3,999,066 A | * | 12/1976 | Osborne et al. | 250/304 |
| 4,092,541 A | * | 5/1978 | Neidl | 250/364 |
| 4,107,533 A | * | 8/1978 | Tabuchi et al. | 250/364 |
| 4,249,603 A | * | 2/1981 | Skogen | 166/251 |
| 4,806,278 A | * | 2/1989 | Vodicska et al. | 252/631 |
| 5,537,450 A | | 7/1996 | Asay et al. | |
| 5,652,013 A | * | 7/1997 | Patch et al. | 427/2.11 |
| 6,126,901 A | * | 10/2000 | Patch et al. | 422/64 |
| 6,251,059 B1 | * | 6/2001 | Apple et al. | 600/3 |

FOREIGN PATENT DOCUMENTS

WO    WO 94/29745    12/1994

* cited by examiner

*Primary Examiner*—Constantine Hannaher
*Assistant Examiner*—Otilia Gabor
(74) *Attorney, Agent, or Firm*—Connolly Bove Lodge & Hutz LLP

(57) ABSTRACT

A device for determining, by detection and calculation, nuclide contents of radioactive inert gases. The device includes a measuring chamber (1) which contains the inert gases, a detector (3) which detects gamma radiation emitted from the radioactive inert gases, calculating members (5) which, based on the detected gamma radiation, calculate the content of the different nuclides.

7 Claims, 2 Drawing Sheets

| Nuclide | Fhoton energy (keV) | Fhoton abundance [ % ] |
|---|---|---|
| Xe-133 | 81.00 | 37.19 |
| Xe-133m | 233.22 | 10.30 |
| Xe-135 | 249.79 | 90.30 |
| | 608.18 | 2.89 |
| Xe-135m | 526.81 | 80.00 |
| Xe-137 | 455.50 | 30.00 |
| Xe-138 | 153.75 | 5.95 |
| | 242.56 | 3.50 |
| | 258.31 | 31.50 |
| | 396.43 | 6.30 |
| | 434.49 | 20.32 |
| | 1768.26 | 16.73 |
| | 2004.75 | 5.35 |
| | 2015.82 | 12.25 |
| Kr-85m | 151.18 | 75.50 |
| | 304.47 | 14.00 |
| Kr-87 | 402.70 | 48.30 |
| | 845.60 | 7.25 |
| Kr-88 | 196.32 | 26.28 |
| | 834.83 | 13.12 |
| | 1529.77 | 11.06 |
| | 2195.84 | 13.33 |
| | 2392.11 | 35.00 |
| Kr-89 | 220.90 | 20.40 |
| | 356.06 | 4.20 |
| | 498.00 | 8.00 |
| | 585.80 | 16.90 |
| | 904.27 | 7.33 |
| | 1472.76 | 7.10 |
| | 1533.00 | 8.50 |

DEVICE FOR DETERMINING NUCLIDE CONTENTS OF RADIOACTIVE INERT GASES

TECHNICAL FIELD

The invention relates to a device for determining nuclide contents of radioactive inert gases. The device comprises a cylinder with an arbitrary cross section which surrounds a measuring chamber, where the measuring chamber contains the inert gases, a detector for detecting gamma radiation emitted from the inert gases, and calculating members for calculating the nuclide contents in the inert gases starting from the detected gamma radiation.

BACKGROUND ART

A reactor core in a nuclear reactor comprises a plurality of fuel assemblies arranged vertically in the core in a certain spaced relationship to each other. The reactor core also comprises a plurality of control rods which, by being inserted into and withdrawn from the reactor core, control the output power of the nuclear reactor and start and stop the nuclear reactor. A fuel assembly comprises a plurality of vertical fuel rods, each of which containing a stack of pellets of a nuclear fuel arranged in a cladding tube. During burnup of the nuclear fuel, radioactive inert gases, which are normally retained in the fuel rod, are released. Examples of such inert gases are various nuclides of krypton and xenon.

In the event that a failure arises on a cladding tube during operation such that the inert gases may leak out into the reactor core, the inert gases will accompany the off-gases out of the nuclear reactor out of the nuclear reactor. A minor fuel failure which only causes release of inert gases is no obstacle, per se, to continued reactor operation. In the event that no measures are taken, the fuel failure may grow in magnitude by water and steam penetrating into the fuel rod and cause embrittlement of the cladding tube, whereby other fission products, such as iodine and cesium, may leak out into the reactor water. When the fuel failure is really serious, also uranium and/or plutonium may start leaking out into the reactor core. To prevent a serious fuel failure, it is therefore important to detect each fuel failure as early as possible.

In case of a serious fuel failure, the reactor has to be shut down and the failed nuclear fuel be replaced. This is very costly and should be avoided, if possible. Normally, the reactor is shut down approximately once every year for service and refuelling and then failed nuclear fuel may also be replaced. If a minor fuel failure is detected during operation, it need not be acted upon until the next refuelling. To avoid that the fuel failure in the meantime develops into a great and serious fuel failure, the power may be reduced, by the insertion of control rods, into that part of the reactor core which contains the failed fuel. It is, therefore, important not only to detect the fuel failure during operation, but also to locate where in the reactor core the fuel failure has arisen.

One way of detecting a fuel failure is to measure the total content of radioactive inert gases in the off-gases of the nuclear reactor. One problem with this method is that there are two different sources which emit radioactive inert gases, failed nuclear fuel as well as core contamination, that is, radioactive contaminants deposited on surfaces in the reactor core. The contamination successively increases and becomes an increasingly greater source of error. The inert gases which are emitted from the core contamination, however, differ from those which originate from a fuel failure in that they contain a considerably higher proportion of short-lived nuclides. To be able to determine if the inert gases originate from core contamination or from fuel failure, the distribution of short-lived and long-lived nuclides in the off-gases must be known. It is thus necessary to measure the content of each individual nuclide.

The patent document U.S. Pat. No. 5,537,450 discloses a device for measuring, while the reactor is in operation, the contents of radioactive inert gases in the off-gases from the nuclear reactor for the purpose of detecting a fuel failure as well as a method for locating the fuel failure. During the reactor operation, some of the off-gases from the nuclear reactor are continuously passed to a gamma spectrograph which detects the different inert gases which occur in the off-gases as well as measures the activity level of each one of the inert gases. The activity level for each one of the inert gases is a measure of the content of the inert gas in the off-gases. Based on the detection and the measurement of the different inert gases which occur and what activity levels the inert gases have, an assessment is made whether a fuel failure exists or not. When a fuel failure has been detected, it is determined where the fuel failure is located by moving the control rods, one at a time, in a reciprocating manner such that the power increases and decreases in fuel assemblies located adjacent to the control rod while at the same time the activity levels for the inert gases are measured by the gamma spectrograph. When the power is changed in the failed fuel assembly, also the activity levels of the inert gases are changed. In this way, the failed fuel assembly may be located. There are also natural reasons for increased activity levels for the inert gases which have nothing to do with the fuel failures, for example changes in the flow of the off-gases from the nuclear reactor.

The gamma spectrograph which is used in the above-mentioned patent document comprises a measuring chamber with a detector arranged in the centre of the measuring chamber. During measurement, the measuring chamber is filled with off-gases from the nuclear reactor. The detector detects the photons, so-called gamma radiation, which are released from the inert gases in the measuring chamber during a given measurement period. Each photon gives rise to a pulse, the amplitude of which depends on the energy contents of the photon. A calculating member counts the number of pulses within different given energy intervals and, with knowledge of the length of the measurement period, the number of measured pulses per unit of time in the various energy intervals may be calculated. The content of nuclides of different radioactive inert gases may thus be estimated. From FIG. 2 in the patent document U.S. Pat. No. 5,537,450, it is clear that the detector is a so-called coaxial detector. A typical coaxial detector has the shape of a straight cylinder with a height which may vary between 2 and 7 cm and it measures optimally in an energy range of from 100 keV to about 2000 keV.

Before the location of the fuel failure can be initiated, according to U.S. Pat. No. 5,537,450, the power of the nuclear reactor must be reduced to between 60% and 80% of full power in order not to make the failure worse during the period during which the location of the fuel failure is in progress. Reducing the power of the nuclear reactor is costly and should therefore be done as quickly as possible. A disadvantage of the device described in the above-mentioned document is that it can only make 2–3 measurements per hour.

One of the reasons for a coaxial detector measuring slowly during the detection of the photons which are emitted from the radioactive inert gases is that it gives a high back-ground radiation. The background radiation is caused by interaction in the coaxial detector, for example Compton scattering. The background radiation partially drowns the pulses which are intended to be detected, whereby it becomes necessary to measure for a relatively long time to obtain statistically significant values of the content of nuclides of the different inert gases.

When detecting a fuel failure in a nuclear reactor, Xe-133 is the most important nuclide to measure. Xe-133 is a relatively long-lived nuclide and emits gamma radiation in the energy range around 80 keV. Other nuclides which are of interest to measure, for example Xe-135 and Xe-138, emit gamma radiation with considerably higher energies. Since Xe-133 has a long radioactive half-life in comparison with the other nuclides, it emits much fewer photons per unit of time than these. The coaxial detector which measures optimally in the energy range 100 keV to about 2000 keV provides a large number of pulses from nuclides with high energies. Since there is a limit to the amount of pulses the calculating member is able to handle per unit of time, the computing speed has to be reduced when the number of pulses becomes too high. This means that, in order to be able to measure Xe-133 which emits few photons, the measurement time has to be extended. A large number of pulses from nuclides with high energies thus contribute to the long measurement time.

Since the number of measuring positions is great—one measurement being carried out at each control rod—the long measurement time implies that the nuclear reactor must be driven at reduced power for a long time. Another disadvantage of a long measurement time is that it may be difficult to see the connection between an increase of the activity level for the radioactive inert gases and a certain change of operation of the nuclear reactor. An additional advantage of a long measurement time is that the increase of the flow of inert gases, because of changed power when the control rod is inserted and withdrawn, may proceed for just a few minutes, which makes it difficult to detect the increase.

SUMMARY OF THE INVENTION, ADVANTAGES

The present invention relates to a device for determining, by detection and calculation, nuclide contents of radioactive inert gases. The inert gases may, for example, be contained in off-gases from a nuclear rector. The device according to the invention makes possible measurements while the reactor is in operation and also makes possible a considerably larger number of and considerably more accurate measurements of nuclide contents per unit of time than corresponding prior art devices.

What characterizes a device according to the invention will become clear from the appended claims.

Some of the off-gases from the nuclear reactor, selected in the embodiment, are passed via an inlet pipe into a cylinder with an arbitrary cross section, preferably a substantially circular-cylindrical cross section, which surrounds a measuring chamber. To reduce the measurement time, compared with the measurement time of corresponding prior art devices, the meassuring chamber comprises a detector which has the shape of a thin plate and the thickness of which is within the interval 3–10 mm, preferably between 5 and 10 mm. Such a detector is called a planar detector. A planar detector always has a diameter which is larger than its thickness. A planar detector measures photon energies optimally in an energy range of 5–100 keV. Thereafter, the efficiency of the detector decreases, but it may still detect photons with energies up to about 600 keV. A calculating member, known per se, counts the number of pulses with different energies and establishes a spectrum for the number of pulses at different energies and then analyzes the spectrum and calculates the content of the different nuclides of the radioactive inert gases. When detecting a fuel failure in a nuclear reactor, Xe-133 is the most important nuclide to measure. One advantage of the planar detector is that it is optimally sensitive at the energy of Xe-133 which is difficult to measure while at the same time it is less sensitive to nuclides with higher energies which emit a large number of photons and therefore are easy to detect. An optimum computing speed with respect to Xe-133 may thus be obtained. With a thinner detector, for example a planar detector, compared with the device described under the background art which comprises a coaxial detector, the Compton scattering and hence the background radiation decrease. This implies that the measurement time in the device according to the invention may be considerably reduced while at the same time maintaining the quality of the measurement.

To further reduce the measurement time, the detector is arranged close to one of walls of the measuring chamber. Compared with a detector which is arranged in the centre of the measuring chamber, the background radiation decreases when the detector is arranged close to one of the walls, which is due to a reduced reflection of the radiation in the walls and hence reduced background radiation.

Further, the measurement time is additionally reduced by arranging the measuring chamber such that its volume varies in size in dependence on the activity of the off-gases. When the activity is low, the volume of the measuring chamber is large and when the activity is high, the volume of the measuring chamber is small. The volume varies by arranging a control system, known per se, to move a piston arranged in the measuring chamber in the axial direction of the measuring chamber. The piston is moved in dependence on the activity level of the off-gases. In this way, the computing speed of the calculating member may be optimized whereby the necessary measurement time may be minimized.

A device according to the invention manages up to 30 measurements per hour of the content of nuclides of the radioactive inert gases in the off-gases from the nuclear reactor.

DESCRIPTION OF THE PREFERRED EMBODIMENT

Figure 1:
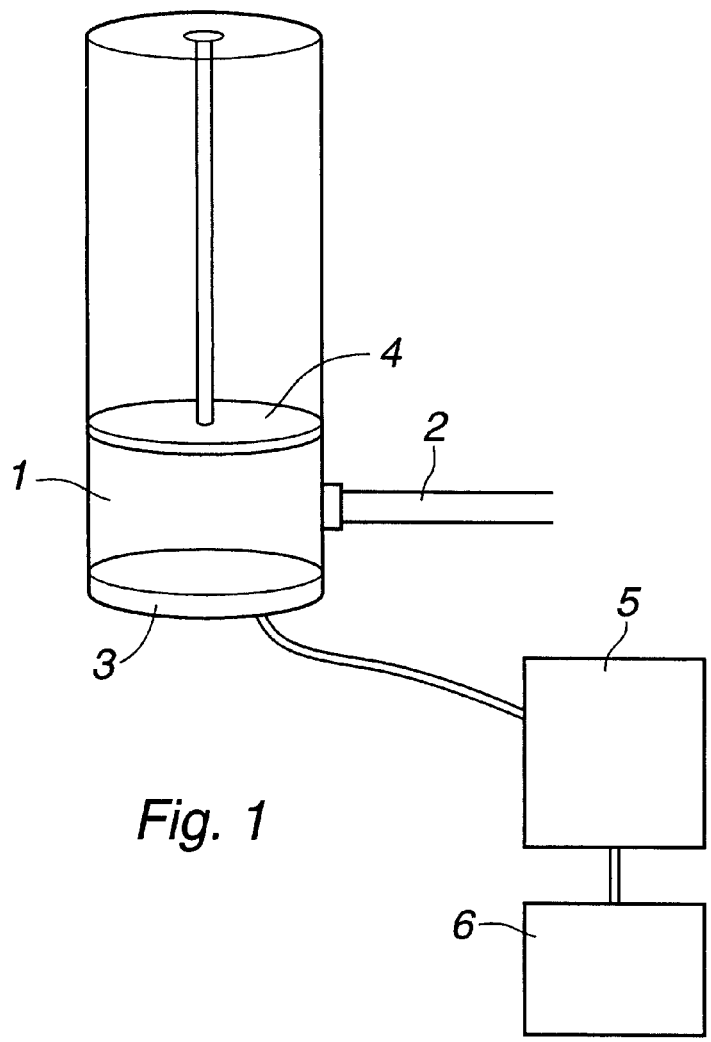
FIG. 1 schematically shows a device according to the invention for determining the nuclide contents of radioactive inert gases.

FIG. 1 shows a device according to the invention for determining, by detection and calculation, nuclide contents of radioactive inert gases. In the embodiment chosen, the inert gases are contained in the off-gases which are produced by a nuclear reactor during operation. Some of the off-gases from the nuclear reactor are passed via an inlet pipe 2 into a cylinder with an arbitrary cross section, preferably substantially circular-cylindrical, which surrounds a measuring chamber 1. The measuring chamber 1 is designed such that its volume may be changed in dependence on the activity of the off-gases. By varying the volume of the measuring chamber, optimization of the computing speed of the number of pulses is made possible. The volume of the measuring chamber 1 is changed by moving a piston 4, arranged in the measuring chamber 1, in the axial direction of the measuring chamber 1. One side of the measuring chamber 1 comprises a detector 3. The detector 3 is a planar detector, preferably of germanium. The planar detector detects those photons, so-called gamma radiation, which are emitted from the inert gases in the measuring chamber 1 during a measurement period determined in advance. Each photon gives rise to a pulse, the amplitude of which depends on the energy contents of the photon. The planar detector is connected to a calculating member, known per se, comprising a calculating unit 5 and an analysis unit 6. The calculating unit 5 counts the number of pulses with different energies and establishes a spectrum for the number of pulses at different energies. The spectrum is then transferred to the analysis unit 6, which analyzes the spectrum and presents the result of the analysis, for example on a screen in the form of a plot of the content of nuclides of radioactive inert gases. Such a device according to the invention manages measurement periods of down to two minutes, that is, up to 30 measurements per hour.

Figure 2:
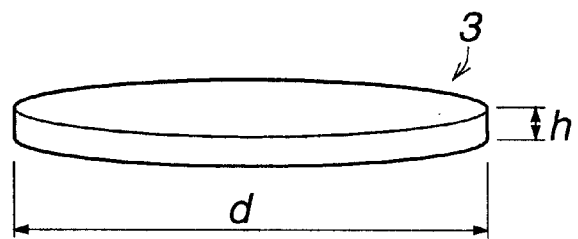
FIG. 2 shows a detector for detecting gamma radiation from the inert gases.

FIG. 2 shows, in principle, how the detector 3 is designed. It has the shape of a circular plate which, in this example, has a thickness h=5 mm and a diameter d=30 mm. Different nuclear reactors have different nuclide compositions in their off-gases. The thickness of the detector 3 may be within the interval 3–10 mm. Which thickness is chosen depends on the nuclide compositon in the off-gases which are to be measured. The diameter of the detector 3 may, of course, also vary but it always larger than the thickness.

Figures 3, 4:
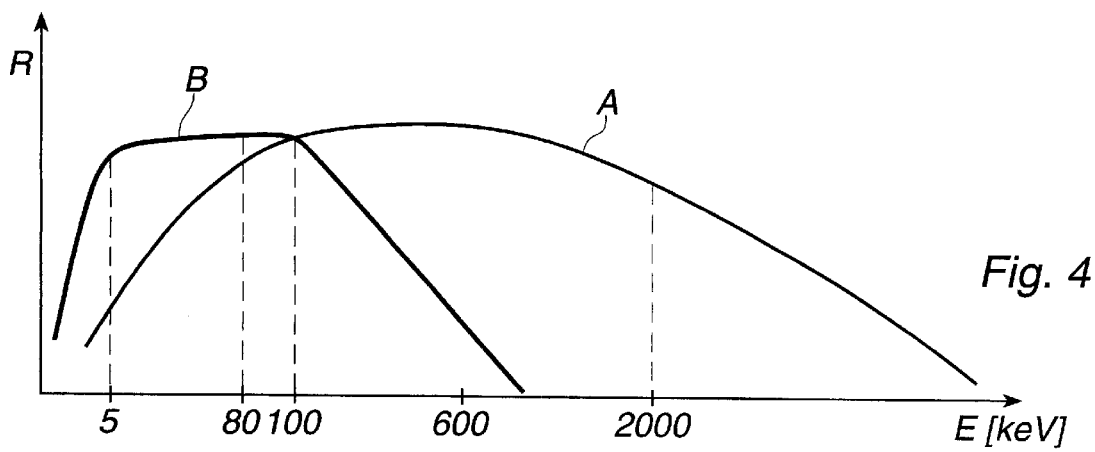
FIG. 3 shows a table of some of the radioactive inert gases which occur in case of a fuel failure and their photon energies.
FIG. 4 shows the relative efficiency R as a function of photon energy for a coaxial detector and for a planar detector.

The composition of nuclides varies depending on the core contamination and the type of fuel failure. The nuclides which should be detected are Xe-133, Xe-133m, Xe-135, Xe-135m, Xe-137, Xe-138, Kr-85m, Kr-87, Kr-88 and Kr-89. FIG. 3 shows a table of the photon energies of these nuclides and their respective photon abundance, that is, the probability that a photon has a certain energy. Certain of the nuclides have several different photon energies, but it is clear from the table that all the nuclides have at least one photon energy below 600 keV with a photon abundance above 10%. This implies that it is sufficient to measure photon energies which lie in the energy interval 50–600 keV.

FIG. 4 shows a diagram of the relative efficiencies R for two different crystal detectors as a function of the detected photon energy. Curve A shows the relative efficiency for a coaxial detector, described under the background art, which measures optimally in the energy range 100 keV to about 2000 keV.

Curve B shows the relative efficiency for a planar detector 3 which measures optimally in the energy range 5–100 keV. For measuring the most important nuclide from the point of view of a fuel failure, Xe-133, the detector 3 has a high efficiency in the energy range comprising 80 keV. By the efficiency of the detector 3 is meant here the measurement sensitivity of the detector at a certain photon energy. Since all the nuclides which are desired to be detected have at least one photon energy below 600 keV with an abundance above 10%, the detector 3 need not measure photon energies above about 600 keV to obtain a satisfactory result.

What is claimed is:

1. A device for determining nuclide contents of radioactive inert gases comprising a cylinder of arbitrary cross section which surrounds a measuring chamber (1), wherein the measuring chamber contains the inert gases, a detector (3) for detection of gamma radiation emitted from the inert gases, calculating members (5, 6) for calculating the nuclides contents of the inert gases, based on the detected gamma radiation, wherein the detector (3) has the shape of a plate, the thickness of which lies within the interval of 3–10 mm.

2. A device according to claim 1, wherein, during reactor operation, it is intended for determining nuclide contents of radioactive inert gases in off-gases from a nuclear reactor.

3. A device according to claim 1, wherein the detector (3) is arranged close to one of the walls of the measuring chamber (1).

4. A device according to claim 2, wherein the measuring chamber (1) is adapted such that its volume may vary in size in dependence on the activity of the off-gases for the purpose of making possible optimization of a measurement time.

5. A device according to claim 1, wherein the inert gases whose nuclides are detected are xenon and krypton.

6. A device according to claim 1, wherein the detector (3) comprises germanium.

7. A device according to claim 1, wherein the detector optimally measures energy values from 5 keV to 100 keV.

* * * * *

UNITED STATES PATENT AND TRADEMARK OFFICE
CERTIFICATE OF CORRECTION

PATENT NO.     : 6,495,835 B1
DATED          : December 17, 2002
INVENTOR(S)    : Bjorn Bjurman et al.

It is certified that error appears in the above-identified patent and that said Letters Patent is hereby corrected as shown below:

<u>Title page,</u>
Item [73], Assignee, please delete "ABB Atom AB" and insert the following:
-- Westinghouse Atom AB --.

Signed and Sealed this

Twenty-fifth Day of March, 2003

JAMES E. ROGAN
*Director of the United States Patent and Trademark Office*